United States Patent [19]

Escobar

[11] Patent Number: 5,780,729

[45] Date of Patent: Jul. 14, 1998

[54] FUEL DELIVERY SYSTEM

[75] Inventor: Michael J. Escobar, Newport, R.I.

[73] Assignee: The United States of America as represented by the Secretary of the Navy, Washington, D.C.

[21] Appl. No.: 696,587

[22] Filed: Jul. 24, 1996

[51] Int. Cl.[6] .................................................. F02C 7/22
[52] U.S. Cl. .......................... 73/117.1; 137/557; 137/565; 137/571
[58] Field of Search ........................... 73/117.1, 864.35, 73/865.9; 137/557, 565, 571

[56] References Cited

U.S. PATENT DOCUMENTS

| 4,519,418 | 5/1985 | Fowler | 137/571 |
| 4,664,134 | 5/1987 | Pera | 137/571 |
| 4,693,271 | 9/1987 | Hargrove et al. | 137/565 |
| 5,058,557 | 10/1991 | Frank et al. | 137/565 |
| 5,234,286 | 8/1993 | Wagner | 137/565 |
| 5,357,996 | 10/1994 | Ioannides et al. | 137/571 |
| 5,609,191 | 3/1997 | Topping et al. | 137/565 |

*Primary Examiner*—Ronald L. Biegel
*Assistant Examiner*—Eric S. McCall
*Attorney, Agent, or Firm*—Michael J. McGowan; James M. Kasischke; Prithvi C. Lall

[57] ABSTRACT

A engine fuel delivery system for vehicles under test, which effectively limits the quantity of fuel under pressurization at any given time during a test sequence of the vehicle's engine. The system thus effectively reduces the magnitude of an explosion which may be caused by pressurization of fuel, and thus the scale of any damage, associated with any inadvertent detonation of pressurized engine fuel.

13 Claims, 1 Drawing Sheet

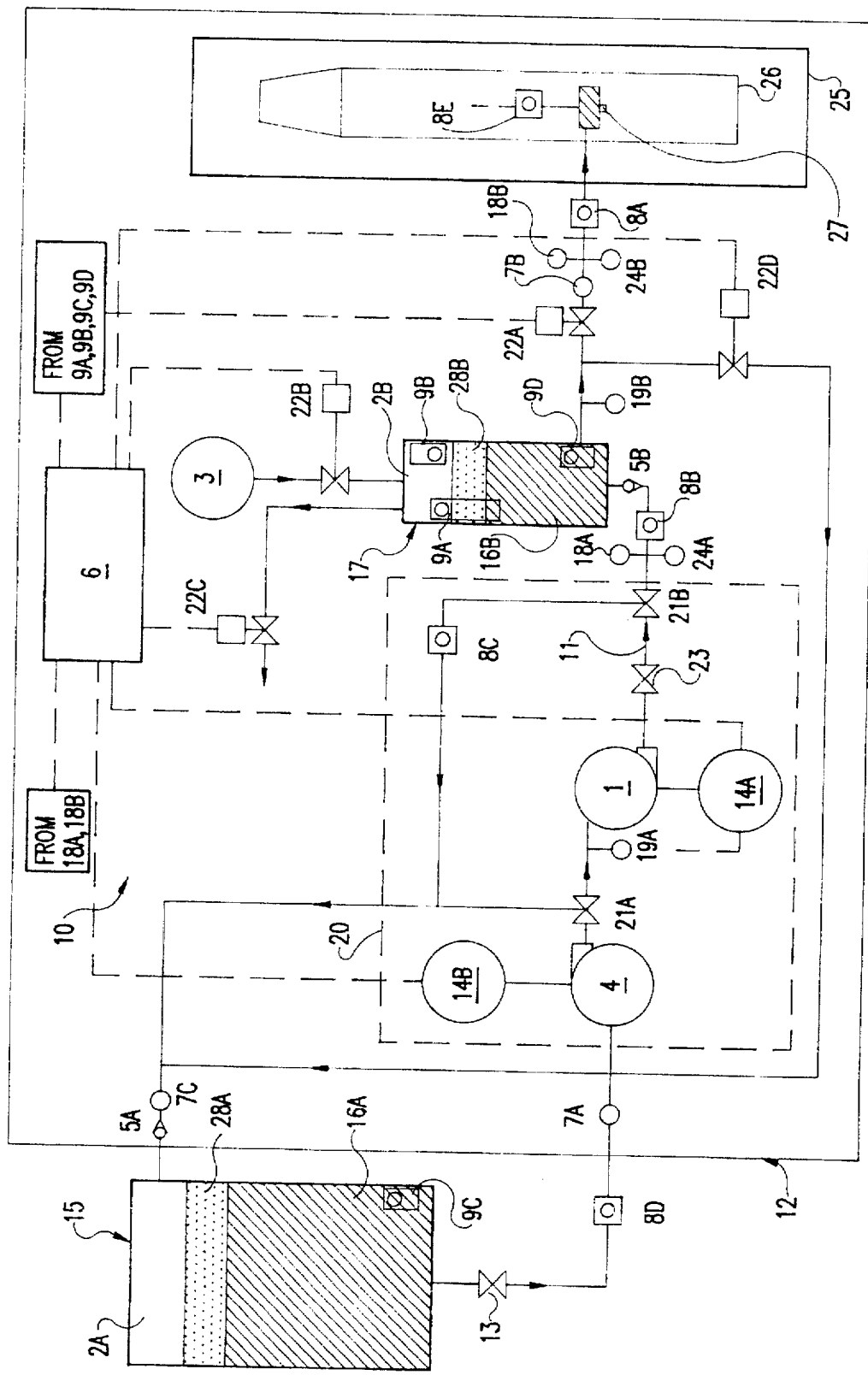

FUEL DELIVERY SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention generally relates to a fuel delivery system which eliminates the risk of a catastrophic fuel explosion.

(2) Description of the Prior Art

Torpedoes are routinely subjected to land based testing to evaluate the on board propulsion system. In such land based testing, one system involves situating and immobilizing a torpedo in a test cell. To simulate load on the drive shaft of the propulsion system of the torpedo, the propeller drive shaft is mechanically connected to a torque device, e.g., a dynamometer. The test cell is an air-tight and water-tight structure. The test cell is flooded with water such that an immobilized torpedo therein is completely submerged in water during the test. The water in the test cell is controllably pressurized to duplicate a depth condition of interest. The torpedo's propulsion system is then tested by running its on board motor. The engine can be run at different speeds and under different tank pressures to comprehensively assess the performance capabilities of the torpedo's propulsion system under a wide variety of simulated operating conditions.

A heavy weight torpedo, such as those tested in this manner, is an external combustion engine powered by Otto fuel. The Otto fuel used to power the engine is a non-corrosive liquid fuel monopropellant developed specifically for use in underwater propulsion systems. "Otto fuel", for purposes of this application, encompasses "Otto Fuel II", which is a known, combustible torpedo fuel based on propylene glycol dinitrate as a propellant. Otto Fuel II also typically contains smaller amounts of adjuvants such as a stabilizer or desensitizer (e.g., 2-nitrodiphenylamine), and a plasticizer (e.g., di-n-butyl sebacate). Pressurized Otto fuel, in general, is less stable and more susceptible to inadvertent explosion. In particular, Otto Fuel II can explode or deflagrate if it is confined and subjected to pressures in excess of 350 psi, or if it is atomized at pressures in excess of 100 psi.

In order to run the propulsion system on board a test torpedo for an extended period of time without interruption of the test sequence, a relatively large quantity of Otto fuel must be made available to the test torpedo. In prior land based testing of heavy weight torpedoes, for instance, in excess of 100 gallons of pressurized Otto fuel has been stored on board the test torpedo. If this quantity of pressurized, combustible Otto fuel inadvertently detonates within the test cell, the fuel explosion emanating from the fuel stored aboard the test torpedo can cause serious structural damage. Even if a test cell largely contains and absorbs the blast to protect the surrounding area, the explosion can result in the loss of test facility assets at least until any necessary repairs are made to the test cell leading to costly program delays.

A system for transporting and handling fluids under high pressure is generally described in U.S. Pat. No. 4,446,804 to Kristiansen et al. which discloses a method of transporting oil and gas under high pressure in tanks on board a ship. The transportation of oil and gas under high pressure in tanks on board a ship is carried out by loading and unloading the oil/gas utilizing a suitable pressurized liquid (e.g., water) in the individual tanks, whereby during loading, a tank or a group of tanks containing pressurized liquid are filled with oil and gas while the pressurized liquid simultaneously is displaced into the next tank or group of tanks which are to be filled, after which the next tank/group of tanks are filled and the pressurized liquid displaced into a third tank/group of tanks, and so forth. During unloading, the cargo in one tank or one group of tanks is removed by introducing a pressurized liquid into the tank/group of tanks, and unloading of the cargo in the next tank/group of tanks occurs by transferring the pressurized liquid from the first tank/group of tanks to the next.

Also, United States Pat. No. 3,874,399 to Ishihara discloses an oil delivery system for high melting point oils in a tank. The oil delivery system effects the discharge of solidified or semi-solidified oil remaining in a tank after primary delivery of the bulk of the oil therefrom by insertion of a nozzle in the free space within the tank, and oil of the same kind as the oil in the primary delivery is heated and directed through the nozzle onto the residual oil, which is thereby melted, and rendered easily movable.

None of the above prior art systems address and solve the problems raised and risks posed by exposure of relatively large quantities of a combustible engine fuel to pressure.

SUMMARY OF THE INVENTION

It is therefore an object of the present invention to provide a fuel delivery system for a test cell which eliminates the risk of a catastrophic fuel explosion during testing of vehicles, such as torpedoes.

In order to accomplish this and other objects of the invention, the present invention provides a fuel delivery system, which effectively limits the quantity of fuel under pressurization at any given time, such as during a test sequence for a vehicle engine. The present invention thus effectively reduces the magnitude of an explosion, and thus the scale of any damage, associated with any inadvertent detonation of pressurized fuel. In one embodiment of the invention, the inventive fuel delivery system supports a test cell used in land-based testing of an underwater vehicle (e.g., a torpedo).

The fuel delivery system of this invention includes a primary fuel storage tank that is mechanically isolated from and located outside the test cell, such as where the propulsion system of underwater vehicle is actually tested, via an intervening fuel support cell. The fuel support cell is also located outside the test cell and houses means which controllably limit the quantity of fuel, as supplied by the primary storage tank, that is pressurized and available at any given instant to support combustion requirements of an engine being tested. The fuel support cell houses both the test vessel in which the vehicle is actually tested, and an external fuel delivery system used to pressurize, store, and feed controlled and reduced quantities of pressurized fuel to the test vehicle. The present invention thus effectively reduces the magnitude of an explosion, and thus the scale of any damage associated with any inadvertent detonation of pressurized fuel.

The external fuel delivery system is "external" in the sense of being located outside the test cell where the vehicle is tested. More particularly, the external fuel delivery system includes a pumping system, an intermediate fuel storage tank, and an arrangement of fuel lines adequate to permit fluid communication between these components. Fuel is drawn from the primary fuel storage tank located outside the fuel support cell and fed into the fuel support cell for handling (processing) by the external fuel delivery system. Before being fed into the test cell for combustion in the engine aboard the test vehicle, fuel is first pressurized through a pumping system and then temporarily stored in small increments in the intermediate fuel storage tank, e.g., about 5 gallons at a time in the case of Otto fuel.

In one preferred arrangement, the multi-stage pumping system involves a two-stage operation. In the first stage, a boost pump creates adequate head pressure in the fuel to prevent cavitation of the fuel in a second succeeding pump stage. Fluid pressure is increased in the second stage to ensure an uninterrupted supply of fuel is maintained to the intermediate fuel storage tank. The fuel is pumped against a reference pressure established in the intermediate storage tank which is referenced to the depth pressure condition concurrently established in the test cell for testing of underwater vehicles. To accomplish this, a pressure-over-liquid tank arrangement is employed to create a back pressure such that the intermediate tank can both temporarily store small quantities of pressurized fuel (obtained from the two-stage pumping system) and transmit the fuel, as needed, into the test cell to power the combustion engine aboard the test vehicle, such as a torpedo. The pumped fuel temporarily stored within the pressure-over-liquid tank is separated from the air in the upper regions of the vessel by an intervening blanket of water to preclude air entrapment in the fuel. A control means is also joined to the primary fuel storage tank, the pumping system, and the intermediate fuel storage tank, which controllably limits the quantity of fuel provided to the test cell.

By virtue of the external fuel delivery system of the present invention, it is possible to modify the fuel tank provided aboard the vehicle, e.g., a torpedo, such that it need only store extremely small quantities of fuel directly aboard the vehicle within the test cell. Namely, only a minimal amount of fuel necessary to power the engine and tolerate instantaneous fuel flow fluctuations in the fuel lines need be stored directly aboard the vehicle in the test cell. In one embodiment of the invention, only about 0.5 gallons of Otto fuel are stored directly aboard a test torpedo, instead of 100 gallons or more of Otto fuel as encountered in practice preceding this invention. Therefore, the force of any explosion associated with the fuel stored aboard the torpedo alone is significantly mitigated.

In a further embodiment, the external fuel delivery system is also supplemented with blast suppression fitting means (e.g., detonation traps) at the inlet and outlet of the external fuel delivery system. In this embodiment, a detonation trap is provided in the portion of the fuel line that feeds the external fuel delivery system from the primary fuel storage tank at a location inside the fuel support cell, and another detonation trap is provided in the fuel line at a location inside the fuel support cell where fuel has cleared the pumping and storage components of the external fuel delivery system but has not yet entered the test cell. The detonation traps help confine any pressurized fuel explosion within the fuel support cell or test cell preventing propagation of a fuel blast through fuel lines. For example, this arrangement prevents any detonation of the pressurized fuel from propagating into the fuel support cell from the test cell, or vice versa, or from propagating from the fuel support or test cell back into the primary reservoir of stored fuel situated outside the fuel support cell. The detonation traps can also be used in conjunction with decomposition arrestors which are utilized to quench any deflagration that could manifest in the fuel line.

Therefore, the fuel delivery system of the present invention is highly advantageous from cost and safety standpoints as it effectively eliminates the risk of a catastrophic fuel explosion during testing of vehicles such as torpedoes.

BRIEF DESCRIPTION OF THE DRAWING

A more complete understanding of the invention and many of the attendant advantages thereto will be readily appreciated as the same becomes better understood by reference to the following detailed description when considered in conjunction with the accompanying drawing wherein:

The Figure illustrates a flow diagram showing a fuel delivery system in accordance with the invention.

DESCRIPTION OF THE PREFERRED EMBODIMENT

Referring now to the Figure, there is shown a fuel delivery system 10 used in the invention. As shown in the Figure, the primary fuel storage tank 15 is situated physically outside of the fuel support cell 12. The bulk fuel stored in the primary fuel storage tank 15 is under ambient pressure. A pressure over liquid arrangement is shown in the Figure for primary fuel storage tank 15 where fuel 16A is stored under air layer 2A with an intervening water layer 28A provided to prevent air entrapment in the fuel 16A. Fuel support cell 12 is a solid enclosure constructed of reinforced-concrete containing the external fuel delivery system 10 and the test cell 25 in which the test vehicle 26, an underwater vehicle (viz., a torpedo) in this illustration, is situated during testing of its on board propulsion system (not shown). The test vehicle 26 is referred to herein occasionally as an underwater vehicle or torpedo merely for sake of illustration and not limitation.

The test cell 25 is constructed of an outer reinforced-concrete enclosure having a common inner wall with a pressure vessel situated therein where tests of the underwater vehicle 26 are actually conducted. As such, the test cell 25 is an air-tight and water-tight structure. In land-based testing, conventional means are provided to situate and immobilize the torpedo 26 in the pressure vessel of the test cell 25. To simulate load on the drive shaft of the propulsion system of the torpedo 26, the propeller drive shaft is mechanically connected to a torque device of a conventional kind, e.g., a dynamometer (not shown). During a test run, the test cell 25 is completely flooded and filled with water such that the immobilized torpedo 26 therein is completely submerged in water during the test. The water in the test cell 25 is controllably pressurized by a depth control of conventional design and usage to duplicate the depth condition of interest. The torpedo's propulsion system is then tested by running its on board motor.

The components of the propulsion system for torpedo 26, other than its on board fuel storage tank 27, include components common to conventional torpedo propeller systems which will be appreciated by those of ordinary skill in the art and which do not form essential parts of the present invention of interest. For example, suitable conventional torpedo propulsion systems include a propeller mounted at the stern end of an internally mounted propeller drive shaft, and the propeller is driven rotationally thereby. The drive shaft is driven by a combustion engine powered by Otto fuel stored aboard the torpedo.

During a test run, the torpedo's propulsion system is tested under varying conditions of pressure and speed as conducted in test cell 25. The fuel needed to power the torpedo's propulsion system directly draws upon a small reservoir of Otto fuel, e.g., only about 0.5 gallons of Otto Fuel II, stored in tank 27 aboard the torpedo itself. By modifying the on board fuel tank 27 to only store the minimal amount of fuel necessary to power the engine and tolerate instantaneous fuel flow fluctuations in the fuel lines, the explosive force of any inadvertent explosion associated with the fuel stored aboard the torpedo 26 alone is significantly reduced. In order to replenish the fuel in fuel tank 27, as it is consumed to power the torpedo's engine, the external fuel delivery system 10 of the present invention is employed.

The external fuel delivery system 10 is supplied fuel from the primary fuel storage tank 15 located outside the fuel support cell 12. Tank 15 has a float switch 9C to prevent complete evacuation of the tank if the fuel level reaches a lower threshold level. Flow of fuel from the primary fuel storage tank 15 to fuel support cell 12 is controlled by speed control valve 13, which is provided with adjustable positions. Flow meter 8D permits the feed rate to be monitored to control the setting of the speed control valve 13. A blanket of water 28A floats on top of the fuel 16A stored in the primary storage tank 15 to negate the possibility of air entrapment in the fuel 16A. Fuel that has been drawn from the primary fuel storage tank 15 outside the fuel support cell and fed into the fuel support cell 12 for handling by the external fuel delivery system 10 is first pressurized through a pumping system 20, and then temporarily stored in small increments in the intermediate fuel storage tank 17, e.g., about 5 gallons at a time in the case of Otto Fuel II, before being fed into the test cell 25 for combustion in the engine aboard the test vehicle 26.

In greater detail, as shown in the Figure, the pumping system 20 is a two-stage pumping system, and its purpose is to pump fuel to intermediate fuel storage tank 17. The first stage of the pumping system 20 is a centrifugal boost pump 4 that creates a head pressure of 30 psi in the fuel. The second stage of the pumping system 20 is a positive displacement pump 1 that requires a 30 psi head, provided by the boost pump 4. The boost pump 4 is used because Otto fuel, when allowed to cavitate and then compress, can cause an adiabatic compression of the fuel leading to a pump explosion. The boost pump 4 is driven by its motor 14B and positive displacement pump 1 by its respective motor 14A. Pressure switch 19A monitors the head pressure created by the boost pump 4 and it will shut off the motor 14A of the positive displacement pump 1 if minimal head pressure has not been established by the boost pump 4. The positive displacement pump 1 can create fuel pressures of up to about 2,000 psi. Relief valves 21A and 21B, used in conjunction with flow meter 8C and one-way control valve 5A, are provided in support of pumping system 20. The relief valves 21A and 21B allow the fuel lines 11 to be bled off if excessive pressures are created by either the boost pump 4 or positive displacement pump 1. If fuel is bled off in this manner, one-way control valve 5A allows the fuel to be recycled back into the primary storage tank 15. Flow control valve 23 is provided for use in conjunction with speed control valve 13 to adjust the amount of fuel delivered from pumps 4 and 1.

The fuel pumped by the positive displacement pump 1 is pumped against a depth control system reference pressure through the use of a pressure-over-liquid tank arrangement established in intermediate fuel storage tank 17. The "depth control system reference pressure" created in the air blanket 2B above the water blanket 28B in intermediate tank 17 is established by an air supply feed system 3. The air supply feed system 3 feeds from a separate air supply, which is shared by the water in the pressure vessel of test cell 25.

During a test run, solenoid valve 22B (normally closed) is energized and opened, and solenoid valve 22C (normally open) closed, so that the air supply system 3 can create a back pressure in the intermediate tank 17 which will be the same as the water pressure being created in the pressure vessel shell of the test cell 25. The fuel 16B within the intermediate tank 17 is separated from the pressurized air 2B by an intervening blanket of water 28B to negate the possibility of air entrapment in the fuel 16B in intermediate tank 17. Once the test run is completed, solenoid valve 22B is de-activated and solenoid valve 22C re-opened to vent the pressurized air in intermediate storage tank 17.

The fuel level within intermediate storage tank 17 is controlled by float switches 9A and 9D. When float switch 9A, as a pumping switch, is energized (activated) by the fluid level falling below a given amount, it will activate the pumps in the pumping system 20 to keep re-filling the tank 17 with fuel. One-way control valve 5B is opened when the boost pump 4 and positive displacement pump 1 are running. Flow meter 8B, pressure sensor 18A, and temperature sensor 24A are also used in support of the pumping operation to intermediate tank 17. When float switch 9D is activated by the fuel level falling to another lower threshold level, it will shut off fuel flow by closing solenoid valve 22A to prevent air from being pumped into the test vehicle 26 and test cell 25. Float switch 9B is a safety switch which shuts off the pumping system 20 if the fuel level becomes too high in intermediate fuel storage tank 17.

By these means, the intermediate tank 17 can temporarily store relatively small quantities of pressurized fuel (obtained from the two-stage pumping system 20) before its transport, as needed, into the test cell 25 to power the combustion engine aboard the test torpedo 26.

During the test run, the fuel temporarily stored in intermediate fuel storage tank 17 is fed to the fuel tank 27 aboard test vehicle 26 by energizing and opening solenoid valve 22A (normally closed), where the fuel is monitored in transit by pressure sensor 18B, temperature sensor 24B, and flow meter 8A. The back pressure created by the pressurized air 2B formed in intermediate fuel storage tank 17 forces the fuel out of the tank 17 and through the intervening fuel lines to fuel tank 27 aboard test torpedo 26. Pressure switch 19B operates to close solenoid valve 22A and concurrently open solenoid valve 22D (which supports another recycle fuel line), if an insufficient fuel line pressure is detected in the fuel line exiting intermediate tank 17. The fuel stored aboard the test torpedo 26 is fed to a drive system (not shown) through flow meter 8E during the test run. The external fuel delivery system 10, including the pumping system 20 and intermediate fuel storage tank 17, are all supported by an arrangement of fuel lines 11 adequate to permit fluid communication to-and-from and between these components. Further, the fuel delivery system 10 is monitored and controlled remotely through the series of solenoid valves, pressure switches, pressure and temperature sensors and flow meters, as discussed herein and shown in the Figure. A computer controller 6 is provided in communication with the components of this device to shut down the pumping system 20 or issue a warning if an error occurs. The computer controller 6 is linked to receive information from float switch 9C in primary storage tank 15 and float switches 9A, 9B, and 9D in the intermediate storage tank 17. Controller 6 can also be joined to flow meters 8A, 8B, 8C, 8D and 8E to monitor fuel flow through the system. Likewise, computer controller 6 is joined to pressure sensors 18A and 18B and temperature sensors 24A and 24B to detect the pressure and temperature of the pressurized fuel. Computer controller 6 provides a control signal to pump motors 14A and 14B and solenoid valves 22A, 22B, 22C, and 22D to enable controller 6 to shut down fuel flow to the test cell 25 in circumstances that indicate an error.

By virtue of the external fuel delivery system 10 of the present invention, it is possible to modify the on board fuel tank 27 provided aboard the torpedo 26, such that it need only store extremely small quantities of fuel directly aboard the test vehicle (located within the test cell 25). Namely, only a minimal amount of fuel necessary to power the engine and tolerate instantaneous fuel flow fluctuations in the fuel lines need be stored directly aboard the test vehicle 26 in the test cell 25. In one embodiment of the invention, only about 0.5 gallons of Otto fuel are stored directly aboard a test torpedo 26, instead of 100 gallons or more of Otto fuel as encountered in practice preceding this invention. Therefore, the force of any explosion associated with the fuel stored aboard the torpedo alone is significantly mitigated. Despite the significantly reduced amount of fuel stored aboard the test torpedo as made possible by the present invention, it has been found that the size of the on board tank 27 and the flow characteristics of the pumping system 20 are nonetheless adequate to support any instantaneous fuel flow fluctuations.

In a further embodiment, the external fuel delivery system 10 is also supplemented with blast suppression fitting means (e.g., detonation traps) of a conventional design, at the inlet and outlet of the external fuel delivery system 10. In this embodiment, the detonation trap 7A is provided in the portion of the fuel line that feeds the external fuel delivery system 10 from the primary fuel storage tank 15 at a location inside the fuel support cell 12. Another detonation trap 7B is provided in the fuel line at a location inside the fuel support cell 12 where fuel has cleared the pumping and storage components of the external fuel delivery system 10 but has not yet entered the test cell 25. A detonation trap 7C is also included as shown in the Figure. This provision of detonation traps helps to confine any explosion of pressurized fuel to within the fuel support cell or test cell, where it occurs, respectively, by preventing propagation of such fuel blasts through the fuel lines into adjacent cells otherwise in fluid communication with the cell in which the blast occurs and/or the area outside and surrounding the particular cell in which the blast occurs. For example, this arrangement prevents any detonation of the pressurized fuel from propagating into the fuel support cell 12 from the test cell 25, or vice versa, or from propagating from the fuel support 12 or test cell 25 back into the primary reservoir of stored fuel 15 situated outside the fuel support cell 12. The detonation traps can also be used in conjunction with decomposition arrestors (not shown) of conventional nature which are utilized to quench any deflagration that could manifest in the fuel line.

The subject invention is capable of delivering fuel to support all required heavy weight torpedo engine fuel flow and pressure requirements while exposing less than about 5½ gallons of Otto Fuel to pressure at any given instance during the test sequence. It has been determined that an explosion of about 5 to 6 gallons or less of Otto Fuel will not result in serious damage to a test facility. This advantage is realized with minimal impact upon the conduct of the test or the validity of the test results.

Although not particularly limited, the type of combustion fuel employed to power the engine on board the torpedo optimally is a so-called Otto fuel known to those of skill in the art. A suitable formulation of "Otto fuel", for purposes of this invention, is an "Otto Fuel II" formulation involving a mixture containing propylene glycol dinitrate as a propellant material, an amount of di-n-butyl sebacate effective to plasticize the mixture, and an amount of 2-nitrophenylamine effective to stabilize the mixture. The propellant, i.e., propylene glycol dinitrate, is the predominant component of the mixture. One exemplary formulation of the Otto Fuel II suitable for use practicing in the invention includes, by weight percentages, the following:

(a) about 76% propylene glycol dinitrate ($C_3H_6N_2O_6$; CAS No.: 6423-43-4);

(b) about 22.5% di-n-butyl sebacate ($C_4H_9OCO(CH_2)_8OCOC_4H_9$); and (c) about 1.5% 2-nitrophenylamine (o-$C_6H_5NHC_6H_4NO_2$);

where the maximum moisture ($H_2O$) content of the mixture does not exceed 0.10% by weight. This formulation of Otto Fuel II has the following physical characteristics (at 77° F.):

density: 1.232 g/ml
freezing point: −18.4° F.
vapor pressure: 0.0877 mm Hg
viscosity 4.4 cp
surface tension: 34.45 dynes/cm
flash point: 265° F.
water satur. pt.: 0.31%
heat capacity: 0.445 BTU/lb° F.
solubilities: insoluble: water, ethylene glycol very soluble: alcohols, gasoline, acetone In view of the foregoing, it is seen that the invention provides an effective solution to previous problems related to risks of catastrophic fuel explosion during land based testing of underwater vehicles such as torpedoes.

In light of the above, it is therefore understood that within the scope of the appended claims, the invention may be practiced otherwise than as specifically described.

What is claimed is:

1. An engine fuel delivery system for a test cell, comprising:

a primary storage tank located outside said test cell for holding monopropellant fuel at ambient pressure outside said test cell;

a fuel support cell located outside said test cell;

a pumping system located inside said fuel support cell having an input and an output and said input being joined to said primary storage tank for providing said monopropellant fuel at a predetermined pressure;

an intermediate storage tank having an input and an output, said intermediate storage tank being located inside said fuel support cell and intermediate storage tank input in fluid communication with said pumping system output for storing a quantity of said monopropellant fuel at said predetermined pressure, said intermediate storage tank output being in fluid communication with said test cell;

a pressure sensor positioned in fluid communication between said pumping system and said intermediate storage tank and capable of detecting the output pressure of said pumping system; and a control means joined to said primary storage tank, said pumping system, said pressure sensor and said intermediate storage tank and controllably limiting the quantity of monopropellant fuel provided to said intermediate storage tank and said test cell at said predetermined pressure.

2. The engine fuel delivery system of claim 1 wherein said pumping system comprises:

a boost pump having an input joined to said primary storage tank and an output for providing said fuel at sufficient pressure to prevent cavitation of said fuel; and a positive displacement pump having an input joined to said boost pump output and an output joined to said intermediate storage tank, said positive displacement pump providing fuel at said predetermined pressure.

3. The engine fuel delivery system of claim 2 further comprising at least two detonation traps, one said detonation trap being positioned in fluid communication between said primary storage tank and said pumping system, and said second detonation trap being positioned in fluid communication between said intermediate storage tank and said test cell, said detonation traps being provided to stop the propagation of uncontrolled fuel reactions through said engine fuel delivery system.

4. The engine fuel delivery system of claim 2 further comprising a first relief valve positioned in fluid communication between said boost pump and said positive displacement pump that discharges fuel when said boost pump output is excessively pressurized.

5. The engine fuel delivery system of claim 4 further comprising a second relief valve positioned in fluid communication between said positive displacement pump and said intermediate storage tank that discharge fuel when said positive displacement pump output is excessively pressurized.

6. An engine fuel delivery system for a test cell, comprising:

a primary storage tank located outside said test cell for holding fuel at ambient pressure outside said test cell;

a fuel support cell located outside said test cell;

a pumping system located inside said fuel support cell and joined to said primary storage tank for providing fuel at a predetermined pressure;

an intermediate storage tank located inside said fuel support cell and in fluid communication with said pumping system for storing a quantity of fuel at said predetermined pressure, said intermediate storage tank being in fluid communication with said test cell, said intermediate storage tank comprising a pressure-over-liquid tank arrangement, wherein fuel input from said pumping system is temporarily stored under a layer of water, said layer of water being covered by a layer of pressurized air, and said layer of water precluding air entrapment in said fuel; and a control means joined to said primary storage tank, said pumping system, and said intermediate storage tank and controllably limiting the quantity of fuel provided to said test cell.

7. The engine fuel delivery system of claim 1 further comprising:

a second pressure sensor positioned in fluid communication between said intermediate storage tank and said test cell and capable of detecting the output pressure of said intermediate storage tank, said second pressure sensor being joined to said control means.

8. The engine fuel delivery system of claim 7 further comprising:

a first temperature sensor positioned in fluid communication between said intermediate storage tank and said test cell and capable of detecting an output temperature of said intermediate storage tank; and a second temperature sensor positioned in fluid communication between said pumping system and said intermediate storage tank and capable of detecting the output temperature of said pumping system.

9. An engine fuel delivery system for a test cell, comprising:

a primary storage tank located outside said test cell for holding fuel at ambient pressure outside said test cell;

a fuel support cell located outside said test cell;

a pumping system located inside said fuel support cell having an input and an output and said input being joined to said primary storage tank for providing fuel at a predetermined pressure;

an intermediate storage tank located inside said fuel support cell and in fluid communication with said pumping system output for storing a quantity of fuel at said predetermined pressure, said intermediate storage tank being in fluid communication with said test cell;

a control means joined to said primary storage tank, said pumping system, and said intermediate storage tank and controllably limiting the quantity of fuel provided to said test cell;

a first pressure sensor positioned in fluid communication between said intermediate storage tank and said test cell and capable of detecting the output fuel pressure of said intermediate storage tank;

a second pressure sensor positioned in fluid communication between said pumping system and said intermediate storage tank and capable of detecting the output pressure of said pumping system;

a first temperature sensor positioned in fluid communication between said intermediate storage tank and said test cell and capable of detecting an output temperature of said intermediate storage tank;

a second temperature sensor positioned in fluid communication between said pumping system and said intermediate storage tank and capable of detecting the output temperature of said pumping system;

a first float switch positioned inside said intermediate storage tank which activates said pumping system to refill said intermediate storage tank when the fuel level inside said intermediate storage tank falls to a first threshold value;

a solenoid valve positioned in fluid communication between said intermediate storage tank and said test cell;

a second float switch positioned inside said intermediate storage tank which closes said solenoid valve to shut off fuel flow to said test cell when the fuel level falls to a second threshold value that is less than said first threshold value;

a third float switch positioned inside said intermediate storage tank which de-activates said pumping system when the fuel level inside said intermediate storage tank rises to third threshold value; and a fourth float switch positioned inside said primary storage tank which de-activates said pumping system when the fuel level inside said primary storage tank falls to a fourth threshold value.

10. The engine fuel delivery system of claim 9 further comprising:

a first one-way control valve positioned in fluid communication between said pumping system and said primary storage tank allowing fuel provided from said pumping system to be recycled back into said primary storage tank; and a second one-way control valve positioned between said pumping system and said intermediate storage tank to prevent fuel from flowing from said intermediate storage tank back into said pumping system.

11. The engine fuel delivery system of claim 10 wherein said control means is a computerized controller, said computerized controller being linked to receive information from said fourth float switch in said primary storage tank and said first, second, and said third float switches in said intermediate storage tank, and linked to said first and second pressure sensors and said first and second temperature sensors to detect the pressure and temperature of said fuel wherein said computerized controller provides a control signal to said pumping system and said solenoid valve.

12. An engine fuel delivery system for a test cell, comprising:

a primary storage tank located outside said test cell for holding fuel at ambient pressure outside said test cell, said primary storage tank comprising a pressure-over-liquid tank arrangement, wherein fuel is stored under a layer of water, said layer of water being covered by a layer of air, said layer of water precluding air entrapment in said fuel;

a fuel support cell located outside said test cell;

a pumping system located inside said fuel support cell and joined to said primary storage tank for providing fuel at a predetermined pressure;

an intermediate storage tank located inside said fuel support cell and in fluid communication with said pumping system for storing a quantity of fuel at said predetermined pressure, said intermediate storage tank being in fluid communication with said test cell; and a control means joined to said primary storage tank, said pumping system, and said intermediate storage tank and controllably limiting the quantity of fuel provided to said test cell.

13. The engine fuel delivery system of claim 1 wherein said monopropellant fuel is Otto fuel.

* * * * *